United States Patent [19]
Nix et al.

[11] 3,834,075
[45] Sept. 10, 1974

[54] TREE TRUNK PRESSURE FEEDING DEVICE

[75] Inventors: Alvin E. Nix, Ashland; Edward F. Maley, Wayland, both of Mass.

[73] Assignee: Tre-X Injector Systems Company, Ashland, Mass.

[22] Filed: Feb. 12, 1973

[21] Appl. No.: 331,678

[52] U.S. Cl. .................................. 47/57.5, 21/73
[51] Int. Cl. ............................................ A01g 29/00
[58] Field of Search .................... 47/57.5, 8; 21/73

[56] References Cited
UNITED STATES PATENTS

| | | | |
|---|---|---|---|
| 318,609 | 5/1885 | Escourron | 47/57.5 |
| 1,583,900 | 5/1926 | Schmittutz | 47/57.5 X |
| 1,629,302 | 5/1927 | Pfister | 47/57.5 X |
| 1,718,195 | 6/1929 | Rankin | 47/57.5 |
| 1,740,484 | 12/1929 | Von Behr | 47/57.5 |
| 1,756,453 | 4/1930 | Davey et al. | 47/8 X |
| 1,982,974 | 12/1934 | Aiken | 21/73 |
| 1,982,975 | 12/1934 | Aiken | 47/57.5 X |
| 2,258,693 | 10/1941 | Yahres | 47/57.5 X |
| 3,290,822 | 12/1966 | Mauget | 47/57.5 |
| 3,295,254 | 1/1967 | Schoonman | 47/57.5 |

FOREIGN PATENTS OR APPLICATIONS

| | | | |
|---|---|---|---|
| 64,306 | 11/1955 | France | 47/57.5 |
| 951,119 | 10/1956 | Germany | 47/57.5 |
| 802,412 | 2/1951 | Germany | 47/57.5 |
| 1,044,498 | 11/1953 | France | 47/57.5 |
| 1,191,053 | 10/1959 | France | 21/73 |
| 1,213,847 | 4/1960 | France | 21/73 |

*Primary Examiner*—Robert E. Pulfrey
*Assistant Examiner*—E. H. Eickholt
*Attorney, Agent, or Firm*—Charles Hieken, Esq.; Jerry Cohen, Esq.

[57] ABSTRACT

A device for pressure feeding of liquid chemicals into tree trunks comprises a pipe length with a threaded and tapered end for insertion into the tree trunk. Long peripheral slits are provided in the threaded and tapered end as the primary exit for liquid passing through the pipe to carry beneficial chemicals into the tree trunk and to prevent reaction forces of pressure feeding from ejecting the device from the trunk.

11 Claims, 3 Drawing Figures

3,834,075

TREE TRUNK PRESSURE FEEDING DEVICE

BACKGROUND OF THE INVENTION

The present invention relates in general to tree and plant care and more particularly to pressure feeding of liquids carrying beneficial chemicals into the trunk or stalk of trees or other plants [all hereafter referred to as "trunk" or "trunks"].

It is an important object of the present invention to provide effective dispersed distribution of the liquid to the trunk's liquid circulation system.

It is a further object of the invention to provide for such dispersed distribution with minimum disturbance of the trunk.

It is a further object of the invention to provide for unattended pressure feeding of trunks.

It is a further object of the invention to provide apparatus components which are reliable for the above stated purposes.

It is a further object of the invention to provide apparatus components which are simple to handle for the above stated purposes.

It is a further object of the invention to provide apparatus components which are economical consistent with one or more of the preceding objects.

It is a further object of the invention to provide against accidental ejection of pressure feeding components from the trunk consistent with one or more of the preceding objects.

SUMMARY OF THE INVENTION

According to the invention, one or more units of injection apparatus comprise means forming an elongated central axial passage within the apparatus unit and having supply and exit ends and supply and exit end portions, respectively, adjacent the supply and exit ends. The passage forming means have a tapered and threaded exit end portion with circumferentially spaced longitudinal slits therein providing discharge openings for the central passage. An additional axial discharge opening may be provided but, if provided, should have an area less than the aggregate area of the slits.

The apparatus provides greater radial, than axial, reaction forces and thereby reduces the posibility of fluid pressure ejection of the apparatus from a trunk. Each unit of apparatus affords highly dispersed feeding from the circumferentially dispersed and longitudinally extended discharge openings therein.

A plurality of such apparatus units can be inserted into a common trunk at peripherally spaced points thereon for making a complete feeding in one insertion, feed and remove cycle. The safely dispersed feeding and ejection preventing capabilities of the apparatus, described above, permit the operator to leave the feeding apparatus unattended.

Numerous other objects, features, and advantages of the present invention will be apparent from the following detailed description of preferred embodiments, taken in connection with the accompanying drawing in which:

DETAILED DESCRIPTION OF PREFERRED EMBODIMENTS

Figure 1:
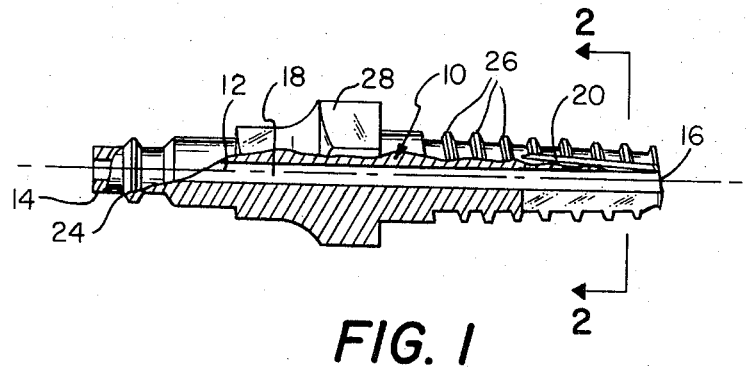
FIG. 1 is a side-view, partially sectioned, of a unit injection apparatus according to the invention.
Figure 2:
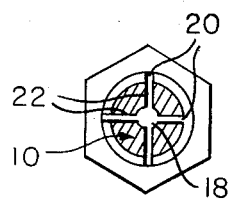
FIG. 2 is a sectional view cut through section 2—2 of FIG. 1.

Referring now to the drawing and more particularly FIG. 1 thereof, there is shown a unit 10 of injection apparatus comprising an elongated metal block of machined, heavy wall, pipe form having a central axis of elongation 12, a supply end 14 and an exit end 16, with a supply end portion 15 and an exit end portion 17. The block has a central bore forming an axial passage 18 running along the axis 12. Referring hereafter to FIGS. 1 and 2 together, multiple slits with openings 20 are formed in the exit end portion of the device 10. These slits extend in the axial direction for a distance of at least half an inch and preferably at least 1 inch and may be formed by criss-crossing kerfs 22 in diametral planes of the unit 10 and thereby intersecting the passage 18.

A quick-connect coupling portion 24 is formed at the supply end portion of the unit 10 and may receive a flexible hose end, or other form of demountable coupling for transmittal of liquid under pressure. The unit 10 is tapered in its exit end portion and has a thread with average pitch less than the average diameter of the tapered end, measured at the thread roots, along the tapered portion with the average longitudinal interval between successive threads being greater than and preferably at least twice the average longitudinal thickness of the thread. Between its supply and exit end portions, unit 10 has a hexagonal collar 28 which acts as a stop against a tree trunk to prevent complete insertion of the unit and for receiving a hex wrench to facilitate insertion and removal of the unit.

While the embodiment illustrated in FIGS. 1–2 shows the unit 10 as a single metal block which is internally and externally machined, the apparatus may also be made of multiple components welded, brazed or otherwise secured together. In particular, the externally faceted annular structure which forms hex collar 28 can be a brazed on nut rather than an integral portion of unit 10.

The threaded and tapered pipe end or other passage, or equivalent passage means, can be embedded in the trunk to the extent of at least 1 inch in length and the elongated peripheral slits are at least one half-inch in length and have an aspect ratio (i.e., ratio of length to width) of at least 10 times and a slit depth less than slit length and preferably no greater than one-fourth of slit length. The elongated slits are preferably formed as kerfs arranged along diametral planes passing through the passage axis 12. The kerfs are made by saw cuts through the exit end of the pipe, preferably extending more than halfway from the end to the stop. Such saw cuts can also be made through radial, as well as or in addition to axial, direction of attack of the saw blade. Such slit formation provides minimum interference with the integrity of the tapered and threaded end portion.

Preferably multiple axial saw cuts are made along orthogonally arranged diametral planes to form the elongated slits which communicate with the central passage and the exterior of the pipe to provide fluid communication to the tree trunk circulation system.

The width of each slit should be no greater than necessary to assure its continuity in the axial direction and the slit length should be such that, taken togehter with the width and the number of slits in the device, the aggregate area of the peripheral slit exits will be greater than the open axial end area. At least one of the multiple diametral planes has such continuity. In making a second saw cut orthogonal to a first saw cut, the second saw cut may deposit material in the first saw cut to make it discontinuous in the axial direction; but this is tolerable so long as the second saw cut itself is completely open. In the course of usage of the injection device, solids may precipitate out from solutions fed through the device and the central passage and slits should be cleaned out from time to time by air blowings.

References to "axial," "axial passage," or the like herein refer to the center axis of the passage 18 in the embodiment of FIGS. 1–2, other longitudinal axes parallel to the center axes or passages along such axes, or any equivalent thereof. References to "diametral" or "radial" herein refer to planes containing such axial passages and may also include, inter alia, spiral planes in addition to flat planes extending generally in the axial direction.

Figure 3:
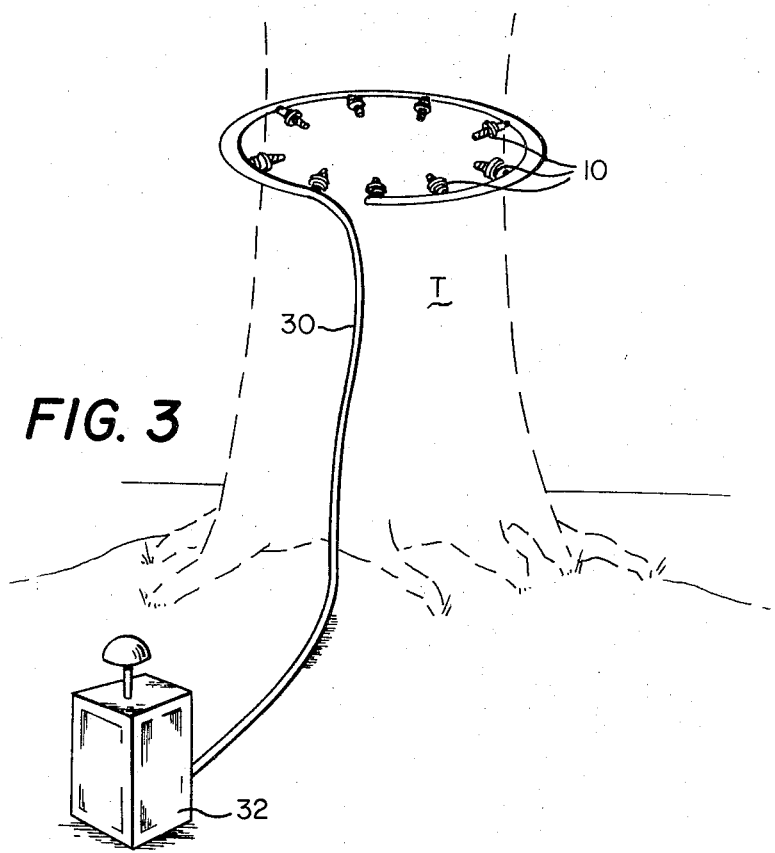
FIG. 3 is a sketch of a tree being fed by multiple units of the injection apparatus of FIGS. 1–2.

FIG. 3 shows a multiplicity of the units 10 injected into a trunk T. The units 10 are fed by a common supply pipe 30 which is preferably a transparent plastic hose having multiple quick coupling/quick disconnect outlets for connection to the various units 10 at their inlet openings.

Smaller or larger trunks will take smaller or larger members of injection apparatus units.

A common source of feed carrying liquid, such as a pressure tank 32, is connected to the inlet of hose 30 to feed the various units 12 in fluid parallel via the parallel outlets of hose 30.

In field use of the present invention with units 10 spaced 6 inches apart for insertion into trunks and using a 5 gallon tank 32 at 8 pounds pressure setting, it was found that units 10 all remained embedded and maintained a rapid feeding at all of the spaced points of injection. Installation was made at 1 foot above ground level in these feedings.

In preparing a trunk for feeding the units 10 are first inserted by hand into the trunk using the taper and threads thereof to facilitate insertion. Then the outlets of hose 30 are fitted to the units. Then a wrench is applied to the hexagonal collar 28 of each unit to advance the unit and butt the collar solidly against the trunk. Pressure feeding is then commenced.

There has been described simple, reliable and inexpensive apparatus and techniques for pressure feeding fluids to trunks with highly dispersed distribution, usability with a variety of trunk sizes and which permit unattended feeding.

It is evident that those skilled in the art, once given the benefit of the foregoing disclosure, may now make numerous variations from and other uses of the specific embodiments herein, without departing from the concept of the invention. Accordingly, the invention is to be construed as embracing each and every novel feature and novel combination of features present in and/or possessed by the apparatus and techniques herein disclosed and limited solely by the scope and spirit of the appended claims.

What is claimed is:

1. Apparatus for insertion into a wood body for transmitting fluid to said body comprising means forming an elongated tubular passage with supply and exit ends, said exit end having a threaded and tapered outer surface and having said passage running coaxially therethrough and being formed with a plurality of longitudinal slits spanning the complete radial distance from said surface to said passage, means defining an additional axially located end opening at said exit end, the aggregate exit area of said slits being greater than the area of said end opening.

2. Apparatus in accordance with claim 1 wherein the passage forming means comprise a length of pipe, and the said slits comprise at least one thin diametral kerf through the pipe in the region adjacent said exit end.

3. Apparatus in accordance with claim 2 wherein said slits comprise multiple intersecting orthogonal diametral kerfs.

4. Apparatus in accordance with claim 2 and further comprising means at said supply end for receiving a quick connect coupling for fliud passage therein at the supply end of the pipe length, and means defining a stop between the supply and exit ends for limiting the penetration of said apparatus into said body.

5. Apparatus in accordance with claim 4 wherein said means defining a stop comprise an annular structure with peripheral facets thereon for receiving a wrench.

6. Apparatus in accordance with claim 1 and further comprising means at said supply end for receiving a quick connect coupling for fluid passage therein at the supply end of the pipe length, and means defining a stop between the supply and exit ends for limiting the penetration of said apparatus into a trunk.

7. Apparatus in accordance with claim 6 wherein said means defining a stop comprise an annular structure with peripheral facets thereon for receiving a wrench.

8. Apparatus in accordance with claim 1 and further comprising means defining a stop located in the supply end half of the length of the passage forming means between the supply and exit ends for limiting the penetration of said apparatus into a body, the said slits being wholly longitudinally within the exit end half of the length of the passage forming means but extending longitudinally more than halfway from said exit end to said stop.

9. Apparatus in accordance with claim 8 wherein the average longitudinal interval between successive threads of the threaded end is at least two times the average longitudinal thickness of the threads and the average pitch of said threads is less than the average diameter of said threaded end portion as measured at the thread roots.

10. Apparatus in accordance with claim 9 wherein said slits comprise multiple intersecting orthogonal diametral kerfs, said exit end includes an additional axially located end opening with an area less than aggregate exit area of said slits, and said means defining a stop comprise an annular structure with peripheral facets thereon for receiving a wrench.

11. Apparatus in accordance with claim 1 and further comprising
a plurality of units of said apparatus,
common fluid supply means therefor
means forming multiple fluid passages extending from said common fluid supply means to each of said apparatus units and being demountably coupled to the inlet means thereof to feed said units in fluid parallel, and permitting said apparatus units to be inserted into a body at spaced locations.

* * * * *